United States Patent
Beda, III et al.

(10) Patent No.: US 8,843,925 B1
(45) Date of Patent: Sep. 23, 2014

(54) ADJUSTABLE VIRTUAL NETWORK PERFORMANCE

(75) Inventors: Joseph S. Beda, III, Seattle, WA (US); Andrew Kadatch, Redmond, WA (US)

(73) Assignee: Google Inc., Mountain View, CA (US)

(*) Notice: Subject to any disclaimer, the term of this patent is extended or adjusted under 35 U.S.C. 154(b) by 37 days.

(21) Appl. No.: 13/296,643

(22) Filed: Nov. 15, 2011

Related U.S. Application Data

(63) Continuation of application No. 13/295,897, filed on Nov. 14, 2011, now Pat. No. 8,276,140.

(51) Int. Cl.
  *G06F 9/455* (2006.01)
  *G06F 9/46* (2006.01)

(52) U.S. Cl.
  USPC .............................................. 718/1; 718/104

(58) Field of Classification Search
  None
  See application file for complete search history.

(56) References Cited

U.S. PATENT DOCUMENTS

| | | | |
|---|---|---|---|
| 5,463,768 A | 10/1995 | Cuddihy et al. | |
| 6,598,179 B1 | 7/2003 | Chirashnya et al. | |
| 7,117,243 B2 | 10/2006 | Peart | |
| 7,761,573 B2 | 7/2010 | Travostino et al. | |
| 7,804,862 B1 | 9/2010 | Olson et al. | |
| 8,276,140 B1 * | 9/2012 | Beda et al. | 718/1 |
| 8,341,623 B2 * | 12/2012 | Korupolu et al. | 718/1 |
| 2004/0139368 A1 | 7/2004 | Austen et al. | |
| 2004/0196497 A1 * | 10/2004 | Klassen et al. | 358/1.15 |
| 2005/0166011 A1 * | 7/2005 | Burnett et al. | 711/112 |
| 2006/0161753 A1 * | 7/2006 | Aschoff et al. | 711/170 |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2008/0086515 A1 | 4/2008 | Bai et al. | |
| 2008/0205415 A1 | 8/2008 | Morales | |
| 2009/0097657 A1 | 4/2009 | Scheidt et al. | |
| 2009/0222815 A1 | 9/2009 | Dake | |
| 2009/0249440 A1 | 10/2009 | Platt et al. | |
| 2010/0057913 A1 * | 3/2010 | DeHaan | 709/226 |
| 2010/0071035 A1 | 3/2010 | Budko et al. | |
| 2010/0199089 A1 | 8/2010 | Vysogorets et al. | |
| 2011/0022812 A1 | 1/2011 | van Der Linden et al. | |
| 2011/0153838 A1 | 6/2011 | Belkine et al. | |

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

Primet, Pascale, et al.., "HIPCAL: State of the Art of OS and Network virtualization solutions for Grids", Sep. 14, 2007, 38 pages.

Wikipedia, "IPSec", [online] [retrieved on Jan. 4, 2011]. Retrieved from the Internet: <URL: http://en.wikipedia.org/wiki/IPsec/>, 8 pages.

(Continued)

*Primary Examiner* — Kenneth Tang
(74) *Attorney, Agent, or Firm* — Fish & Richardson P.C.

(57) ABSTRACT

Methods, systems, and apparatus, including computer programs encoded on a computer storage medium, relating to managing resources. In one aspect, a method includes the actions of receiving configuration information, the configuration information specifying a plurality of parameter values including values for a size and input/output performance parameters, where the size and performance parameters are independently specified by a user; determining one or more physical resources that satisfy the received configuration information; and generating one or more virtual disk instances having the specified size and performance parameters.

36 Claims, 4 Drawing Sheets

(56) References Cited

OTHER PUBLICATIONS

Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [Retrieved on Jan. 20, 2011]. Retrieved from the Internet <URL: http://en.wikipedia.org/wiki/OAuth>, 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia, Anycast [Retrieved on Oct. 10, 2011] Retrieved from the Internet: URL<http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.

\* cited by examiner

ADJUSTABLE VIRTUAL NETWORK PERFORMANCE

CROSS-REFERENCE TO RELATED APPLICATIONS

This application is a continuation application of, and claims priority to, U.S. patent application Ser. No. 13/295,897, for Adjustable Virtual Network Performance to Joseph S. Beda III and Andrew Kadatch, which was filed on Nov. 14, 2011. The disclosure of the foregoing application is incorporated here by reference.

BACKGROUND

This specification relates to providing managing resources.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

This specification describes technologies relating to managing resources.

In general, one innovative aspect of the subject matter described in this specification can be embodied in methods that include the actions of receiving configuration information, the configuration information specifying a plurality of parameter values including values for a size and input/output performance parameters, where the size and performance parameters are independently specified by a user; determining one or more physical resources that satisfy the received configuration information; and generating one or more virtual disk instances having the specified size and performance parameters. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. Generating each virtual disk instance includes allocating usage of at least a share of each of the one or more determined physical resources to the respective virtual disk instance. The method further includes presenting an interface to a user, the interface including fields for specifying discrete values for configuration information including a plurality of parameters. The method further includes monitoring usage of the virtual disk instance. The method further includes determining that the usage of the virtual disk instance is less than a threshold for the specified parameter; and suggesting a modification of the parameter based on the usage. The method further includes updating the performance parameter for the virtual disk instance. Updating the parameter further includes updating an allocation of one or more physical resources to the virtual disk instance. A pricing for the virtual disk instance is adjusted based on the specified size and performance parameters. The virtual disk instance appears to a user as a single physical disk having the specified size and input/output performance parameters regardless of the number of physical resources allocated to the virtual disk instance. The performance of a plurality of physical resources allocated to the virtual disk instance is smoothed to mimic a single machine. The method further includes receiving one or more user adjustments to the size and performance parameters; and dynamically modifying the one or more virtual disk instances based on the received user adjustments. The one or more virtual disk instances are used to build an instance of a virtual machine. Receiving configuration information includes providing controls for receiving user input specifying virtual disk parameter values unconstrained by physical hardware.

In general, one innovative aspect of the subject matter described in this specification can be embodied in methods that include the actions of providing usage data for a virtual disk instance; receiving user input modifying one or more configuration parameters for the virtual disk instance; and dynamically updating virtual disk configuration according to the modified one or more configuration parameters. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method further includes determining that the usage of the virtual disk instance is less than a threshold for a specified parameter; and suggesting a modification of the parameter based on the usage. Suggesting the modification include presenting a changed pricing for the updated virtual machine instance based on the modified parameter. The configuration parameter is an I/O rate. The configuration parameter is throughput. The method further includes updating a virtual machine instance associated with the virtual disk based on the updated configuration parameters.

Particular embodiments of the subject matter described in this specification can be implemented so as to realize one or more of the following advantages. Users can specify a quality of service for virtual machine resources (e.g., disk input/output rate, throughput) in a flexible manner. Users can also dynamically specify other aspects of virtual machine resources, for example, disk durability for virtual disks. The aspects can be specified at setup time, a discrete conversion process, or through run time parameter adjustments. In particular, performance characteristics of virtual disks can be dynamically changed during runtime.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
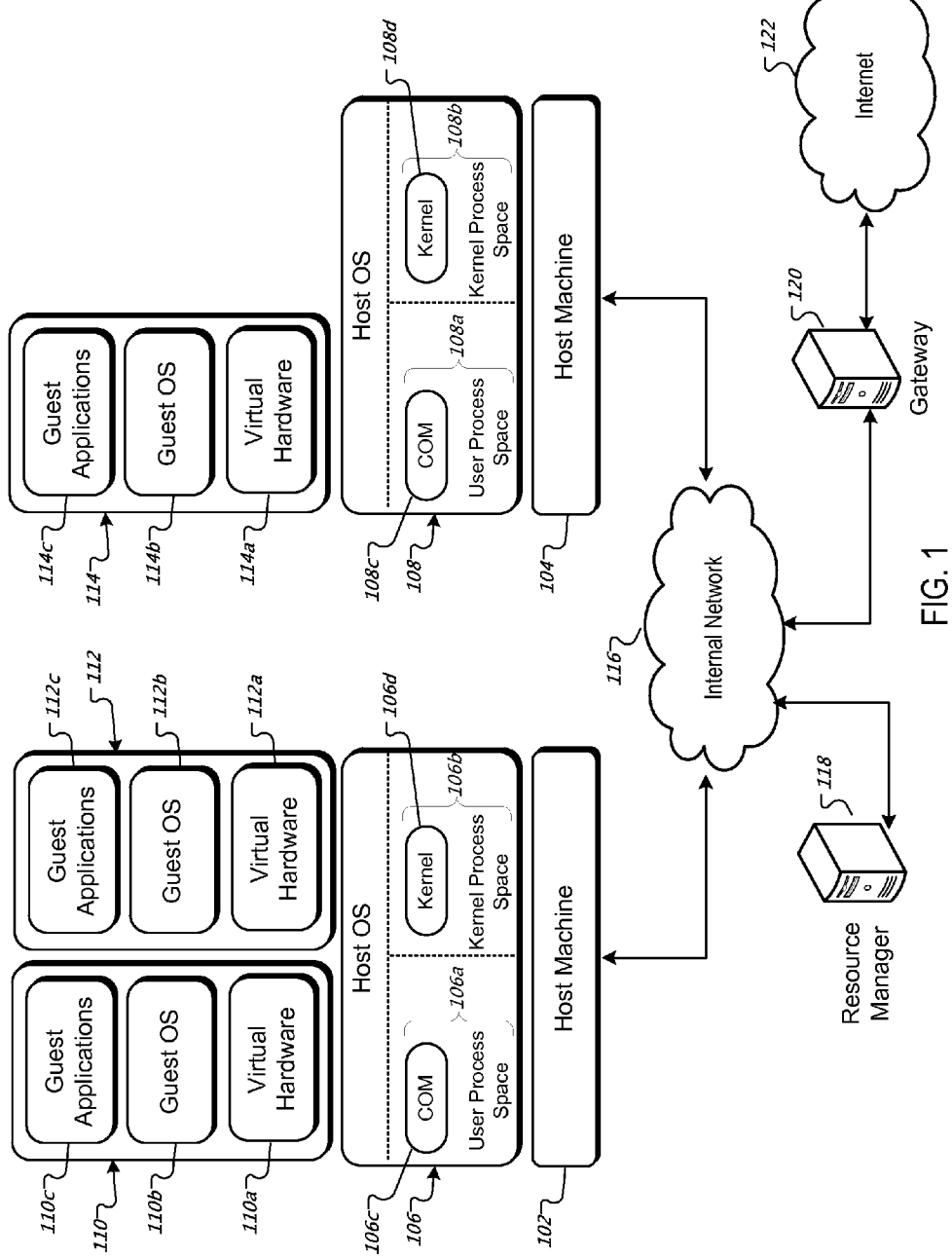
FIG. 1 is a schematic illustration of an example virtual machine system.

Users can specify a configuration for one or more virtual machine instances including one or more parameters for the virtual machines. Parameters can include, for example, storage size for one or more virtual disks of the virtual machine instances as well as performance. Performance can include bandwidth and/or input/output performance (e.g., disk read/write rate) of virtual disks. The parameters can be specified independently of each other, for example, such that a particular performance rate of a particular virtual machine instance does not depend on the storage size of the virtual machine instance.

A virtual machine instance can be generated that includes one or more virtual disks satisfying the specified size and performance characteristics. In particular, a virtual disk can be configured in a flexible manner. These virtual disks are attached to particular virtual machine instances. The parameters for a virtual disk can be set at creation time, changed online through an offline conversion process, or set dynamically and transparently to a running virtual machine. Thus, for a given virtual machine instance, a user can modify characteristics of a virtual disk allocated to that virtual machine instance.

One or more physical resources (e.g., physical disks) that satisfy the size and performance parameters are identified for use by the virtual machine. The virtual machine instance can include virtual hardware to mimic a physical device having the selected configuration. Thus, for example, the virtual machine instance can appear to a user as a single physical machine instance even though the virtual machine instance can be associated with various physical resources. For example, a single virtual disk allocated to the virtual machine instance can be associated with multiple and/or fractions of physical disks. In some implementations, the performance of the actual physical resources allocated to the virtual machine instance can be smoothed such that the virtual machine instance more closely mimics the physical device represented by the virtual hardware of the virtual machine instance. Additionally, performance of a virtual machine instance can be restricted to mimic a corresponding physical device.

In some implementations, actual virtual disk usage can be monitored and compared with the specified configuration parameters. For example, if actual performance usage (e.g., an actual rate of read/write operations) is less than a level specified by the performance parameter (e.g., by a threshold amount), the measured usage levels can be provided or a suggestion of a modified performance parameter can be provided. The user can modify the configuration of the virtual disk to modify one or more performance parameters. In some implementations, the configuration is automatically changed to modify one or more performance parameters. The modified one or more performance parameters, for example, can be a reduction based on the actual usage. Alternatively, the modified one or more performance parameters can be a variable performance parameter based on actual usage with respect to particular times or days. The configuration of the one or more virtual disks can be updated during runtime in response to the one or more modified performance parameters.

FIG. 1 is a schematic illustration of an example virtual machine system 100. The system 100 includes one or more host machines, for example, host machine 102 and host machine 104. Generally speaking, a host machine is one or more data processing apparatus such as a rack mounted servers or other computing devices. The data processing apparatus can be in different physical locations and can have different capabilities and computer architectures. Host machines can communicate with each other through an internal data communication network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system ("OS") or other software that virtualizes the underlying host machine hardware and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of the hardware is referred to as virtual hardware (e.g., virtual hardware 110a, 112a and 114a). For example, the simulated hardware can include one or more virtual disks. The virtual disks can be associated with physical disks that are local to the machine the virtual machine instance is running on or remotely located. Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, e.g., one for each VM executing on the host machine. In yet further implementations, some portion of the communication process executes in the user process space and another portion executes in the kernel process space.

The communication process communicates with a registry service (e.g., VM registry service 118) in order to establish a virtual network pair (VNP) between two VMs. A virtual network pair (VNP) is a logical computer network that is implemented on top of one or more physical (wired or wireless) computer networks. A VNP routes traffic between two endpoints using one or more virtual connections or links. By way of illustration, a VNP between virtual machine 110 and virtual machine 114 would route packets sent between VNP endpoints managed respectively by communication processes 106c and 108c over internal network 116. The VM registry service 118 is one or more data processing apparatus that execute software for keeping track of assignments of network addresses (e.g., IP addresses) to VMs, and for keeping track of network addresses (e.g., IP addresses) of host machines that the VMs are executing on. The data processing apparatus can be in different locations and can have different capabilities and computer architectures.

Figure 2:
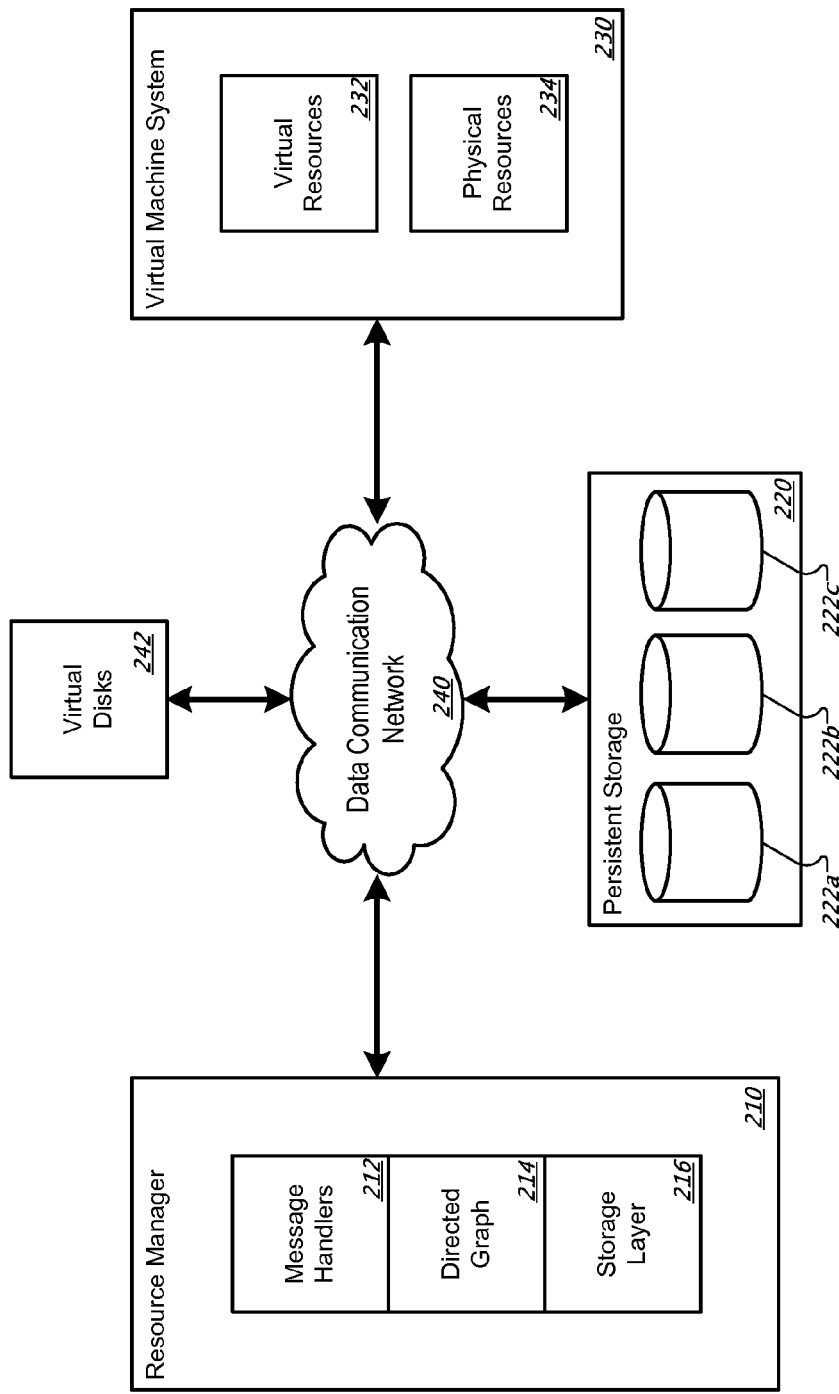
FIG. 2 is a schematic diagram of an example resource manager.

FIG. 2 is a schematic diagram of an example resource manager 210. The resource manager 210 models the allocation and deallocation of resources in the virtual machine system 230. Allocating a resource for the virtual machine system 230 can reserve the resource for a so-called owner that controls the lifecycle of that resource. Ownership need not define an exclusive use relationship. Allocating a resource for the system 230 can also permit a user to use the resource—a usage allocation. Owners and users can be human operators, computer processes, or any other resource in the system 230. Some resources can have a maximum number of owners and users. In some implementations, each resource has exactly one owner.

The resource manager 210 can allocate a variety of types of resources in the virtual machine system 230, including physical resources 234, virtual resources 232, and other resources. Types of resources that can be allocated by the resource manager 210 include, for example, a physical host machine, a physical hard disk, a network connection, network firewall rules, a virtual machine, a logical virtual machine, and a virtual disk. These resources can be allocated to a human owner, to a virtual machine, or to a host machine in the system 230. Additionally, the resource manager 210 can manage creation and parameters of virtual disks 242 along with coordinating usage of virtual disks 242 by particular virtual machine systems 230. In some implementations, the resources are allocated based on a specified virtual machine configuration e.g., to provide a virtual machine having specified size and performance characteristics. In addition to allocating resources, the performance characteristics of those resources can also be specified. Performance characteristics for resources, in particular virtual disks 242, can be controlled dynamically, e.g., using a particular application programming interface.

The resource manager 210 generally operates by routing messages to and from various entities in the system 230. The messages can be sent to entities in the system 230 through an internal data communication network 240, for example, or through other inter-process communication means. The data communication network 240 can be the same network as internal network 116 of FIG. 1, but need not be. Messages can be queued in persistent storage 220 before being handled by a recipient. The persistent storage 220 can persist messages in one or more storage devices so that messages can remain in storage after the processes that stored them have ended or failed. The persistent storage 220 can be replicated across multiple hard disks or other computer-readable media, e.g., disks 222a, 222b, and 222c.

An architecture of the resource manager 210 can include logical software components or layers. An uppermost layer is a message handler layer 212. The message handler layer 212 includes definitions of message types and message handler routines. The message handler routines receive messages and respond in various ways that can affect the allocation or de-allocation of system 230 resources. Message handler routines can also send messages to other entities in the system 230. In some implementations, the message handler layer is implemented in a continuation-passing style in which message handlers are identified explicitly in the message itself. In other words, every message can include an identification of the message handler.

In some implementations, function or procedure calls between layers can be implemented as remote procedure calls. Remote procedure calls allow a software process executing on one data processing apparatus to invoke a software process that is executing on a different data processing apparatus. Using remote procedure calls can allow layers of the resource manager to be implemented on multiple data processing apparatus.

The layer logically below the message handler layer 210 is a directed graph layer 214. The directed graph layer 214 maintains a directed graph of the underlying ownership and usage structure of resources in the system 230. Each node in the graph corresponds to a resource in the system 230, and in some implementations each node has an associated message handler. A node can correspond to a resource (e.g., a hard disk or a virtual machine). Each link in the graph corresponds to an ownership or usage allocation of a resource. The directed graph layer 214 maintains the graph by adding and deleting nodes and links in the graph. For example, if a host machine (e.g., host machine 102) fails, all resources owned or used by that host machine can be de-allocated by deleting the appropriate nodes and links in the graph. In some implementations, if a parent node is deleted, all child nodes and corresponding links are also deleted.

The directed graph layer 214 can use links in the graph to route messages to the appropriate message handlers. For example, a parent node can send a message to a child node. In other words, the parent node's message handler sends a message indicating that the child node's message handler should handle the message. In response, the child node can handle the message through its associated message handler or send a message back to the parent node by indicating that the parent node's message handler should handle the message.

In general, messages can contain any type of data. Some messages can have specific types, which can be handled according to the context of the recipient. For example, a parent node can also send a "Create" message to a nonexistent child node. The message handler for the nonexistent child node can handle a "Create" message by creating an instance of a node. The parent node's message handler sends the "Create" message, indicating that the message should be handled by a new child node after it is created.

The directed graph layer creates a new child node, associates a message handler definition with the new child node, and passes the message to the new child node. The new child node's message handler processes the message. The new child node's message handler can, for example, respond to the parent node by sending a "Create link" message back to the parent node, which can result in a link being created in the graph between the parent node and the child node. Links between nodes can be used by the directed graph layer 214 for appropriately routing messages according to links maintained in the directed graph layer 214.

Some message types cause updates to be propagated to multiple nodes at multiple levels of the graph. For example, a message containing an update to firewall rules may be applicable to multiple elements of data communication network 240, e.g., routers, switches, host machines, and virtual machines. If a node corresponding to the data communication network 240 receives a message to update firewall rules in the network, the updated firewall rules can be propagated to all nodes in the graph requiring the update.

Layering the message handler layer 212 logically above the directed graph layer 214 can allow software developers to easily define new message types and new resource types. Defining a new message type or a new resource type can involve writing software code only for new message handlers in the message handler layer 212 without altering the functionality of the directed graph layer 214. The ability to easily define new resource types and new message types can improve flexibility and scalability of the resource manager because the types of messages and resources modeled in the system are not constrained to a predefined set of resource types.

Messages are sent to entities in the system by the storage layer 216. The storage layer 216 stores all messages in persistent storage 220. Storing messages in the persistent storage 220 can ensure that the resource manager 210 can recover and resume its current state after system failures. In some implementations, the storage layer 216 also stores nodes and links of the directed graph in persistent storage 220 upon creation.

The storage layer 216 can implement and maintain multiple message queues. A separate queue can be created between each pair of communicating nodes in the graph, for instance. Creating multiple queues can improve system throughput and scalability. The particular order of messages in a queue can also be stored in the persistent storage 220, as well as messages in the queue. In some implementations, messages in queues are causally ordered, such that messages sent first are first in the queue. The resource manager can determine which of two messages were sent first by comparing a timestamp included in the message. Other ways of ordering messages in queues are possible.

To send a message, a node in the graph can call the storage layer 216 with the message and an identification of the recipient node. The storage layer 216 can store the message in a queue associated with the recipient node. The storage layer 216 can also enqueue a task in memory of a data processing apparatus to trigger the recipient node's message handler to read and process the message. Upon being triggered, the recipient node's message handler can call the storage layer to read the next message from the queue. The storage layer 216 reads the next message from the appropriate queue and returns the message to the recipient node's message handler for processing.

In some implementations, message handlers can be implemented as transactions. Transactions ensure that either all message handler operations succeed or that no message handler operations succeed. In some implementations, the transactions ensure the "ACID" guarantees of atomicity, consistency, isolation, and durability.

In general, each message handler can make changes to the directed graph layer 214 and send one or more messages to other entities in the system. Examples of operations that message handlers can perform include changing the state of a node, creating or deleting links to other nodes, affecting changes in systems outside of the resource manager 210 (e.g., changes in the virtual machine system 230), sending new messages to itself or to other nodes, and creating or deleting nodes. If requested changes to the directed graph layer 214 are unsuccessful, the message handler can send an error message instead of sending messages associated with a successful change.

For example, if the resource manager tries to allocate an IP address for a virtual machine and succeeds, a success message can be sent. But if the allocation of the IP address fails, an error message can be sent. In the case of critical failures (from, e.g., conflicting messages sent from multiple processes), the resource manager can restore the system by deleting nodes for the failed resources and inserting new nodes into the graph. The transactional implementation of message handlers can ensure that a system failure that occurs before completion of a message handler process will not result in incomplete or partial changes to the directed graph layer 214.

In some implementations, message handlers are stateless; i.e., the actions of a message handler do not depend on the current state of the directed graph layer 214. The transactional implementation of message handlers can improve scalability of the system by implementing transactions on one resource at a time. Implementing transactions on one resource at a time can ensure that multi-message operations serialize at exactly one resource instead of multiple resources. In other words, all resources involved in a multi-message operation need not wait for all messages in the operation to be processed.

As a result of certain failures or errors in the system, some messages may remain unprocessed in the persistent storage 220. The resource manager 210 can determine that an atypical amount of time has passed from the time the message was enqueued and determine that the message is an unprocessed message. In order to handle unprocessed messages, the storage layer 216 can implement a scanner process. The scanner process can be a separate process executing on data processing apparatus that periodically checks the messages queues for unprocessed messages and handles them by invoking the appropriate message handler.

The resource manager 210 can be implemented in multiple instances of processes executing on data processing apparatus, and the multiple process instances can be executing on multiple data processing apparatus. Additionally, each process instance can include multiple lightweight processes (e.g., threads), each lightweight process being triggered to execute software code for message handlers of nodes in the system in response to messages in the persistent storage 220. The ability to implement the resource manager 210 in an arbitrarily large number of data processing apparatus executing message handlers can improve scalability of the resource manager 210. The resource manager 210 can thus manage an arbitrarily large number of resources in the virtual machine system 230.

In the event that two competing processes send conflicting messages to the same node, the resource manager 210 can use the message queues to enforce causal ordering. In other words, a message that was sent first will prevail. The conflicting message that was sent second will fail, which can result in an error message being sent back to the sender.

In some implementations, the resource manager 210 can improve throughput of the message processing by implementing an optimistic master writing process to handle writing messages to the persistent storage 230. The master writing process can be a computer program executing on one or more data processing apparatus of the resource manager 210. An optimistic process is a process that potentially competes with other peer processes for performing the same operation, but an optimistic process does not check for or wait to see if other competing processes might be performing the same operation. Instead, the first optimistic process to successfully complete the task wins the competition.

An identified master writing process can receive write requests from other processes (from, e.g., processes of the directed graph layer 214) and write corresponding messages to the persistent storage 230. Other processes that rely on the master writing process will be referred to as "client processes." The master writing process can write messages to the persistent storage 230 in batches and can perform multiple writes in the same operation, which can improve the throughput of message processing. Throughput can be particularly improved in implementations where the persistent storage 230 is replicated across multiple storage devices that require periodic synchronous replication.

The resource manager 210's current master writing process can be identified by an identifier written into the persistent storage 230. In some implementations, the identifier is an RPC address of the current master writing process. Client processes can retrieve from the persistent storage 230 the RPC address of the master writing process and can use this RPC address to forward messages to the master writing process for writing the messages to the persistent storage 230. A master writing process can send an acknowledgement to the client process that requested the message to be written to the persistent storage 230 to indicate a successful write.

When a new master writing process is started, the new master writes its own identifier (e.g., RPC address) into the persistent storage 230. When other competing master writing processes encounter an RPC address of another master writing process in the persistent storage 230, these competing processes will exit. In other words, competing processes that lose the race to write their own RPC address to the persistent storage 230 automatically end themselves so that only one master writing process exists at a time.

The resource manager 210 can also send messages that affect resources of the virtual machine system 230. For example, a node in the graph can send a "Start VM" message that starts a virtual machine on a host machine in the virtual machine system 230. "Start VM" is an example of a message type. The message can initially be sent to another node in the graph (e.g., to a virtual machine node), or the message can be sent to the same sender node. Sending the "Start VM" through the storage layer 216 can ensure that the message is persisted in storage such that on a system failure, the "Start VM" message will survive and be processed appropriately. When a recipient node receives the "Start VM" message, the node can communicate with a communication process (e.g., communication process 106c) on a host machine (e.g., host machine 106) to start a virtual machine.

In some implementations, the recipient node communicates with the communication process with a remote procedure call. If the remote procedure call fails or never returns, an error message can be sent to the node sending the "Start VM" message. Error messages can be sent through the storage layer 216 to ensure that even after a system failure, the resource manager 210 can resume and handle errors appropriately.

Figure 3:
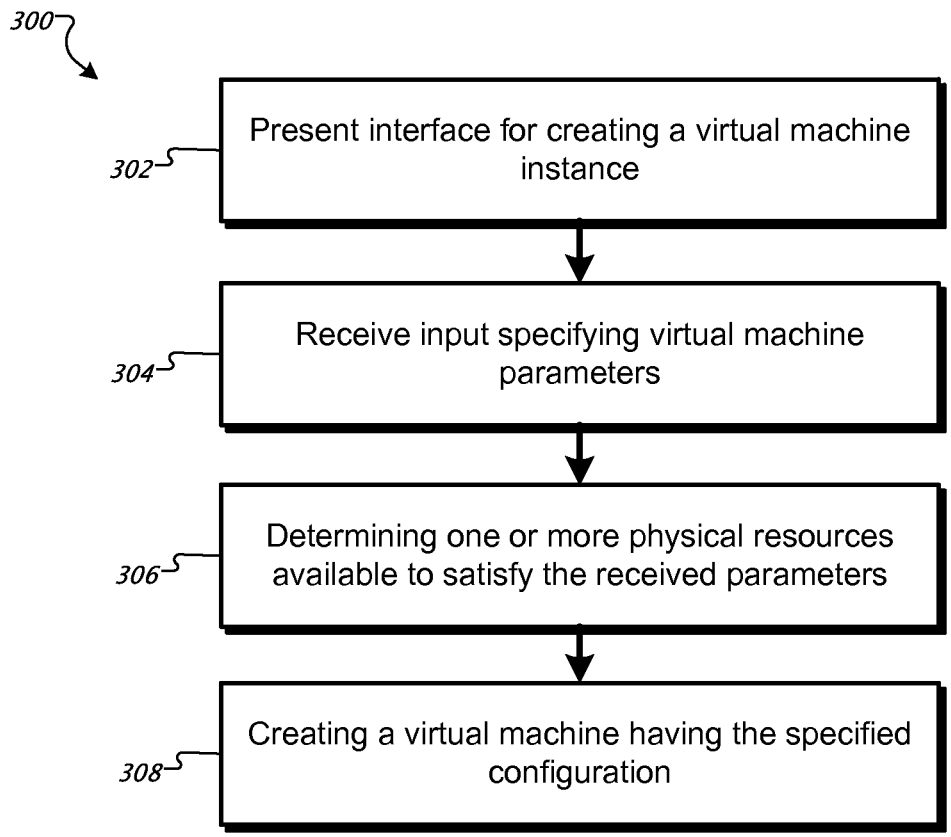
FIG. 3 is a flow diagram of an example process for allocating resources for a particular virtual machine configuration.

FIG. 3 is a flow diagram of an example process 300 for allocating resources for a particular virtual disk configuration. For convenience, the process 300 will be described with respect to a system having one or more computing devices that performs the process 300. In some implementations, the process 300 can be performed by the virtual machine system 100 of FIG. 1.

The system presents an interface for generating a virtual disk instance (302). A virtual disk instance can be generated as part of generating a virtual machine instance that will use the virtual disk instance. In particular, an application programming interface (API), e.g., Hypertext Transfer Protocol (HTTP)/Representational State Transfer (REST)/JavaScript Object Notation (JSON), can be provided. One or more clients can use the API to present features for interacting with the system. For example, using a command line or user interface. For example, when a user (as used in this specification, user includes both individuals as well as entities (e.g., a company)) requests the generation of a virtual disk, a user interface can be provided by the system.

The user interface can include a number of configuration parameters for customizing a virtual disk instance or instances that satisfy the user's specifications. The configuration parameters can be used to generate both a virtual disk instance as well as for a virtual machine associated with the generated virtual disk instance. For example, the parameters can include a memory storage size (e.g., a size for one or more disks), a bandwidth for communicating with the virtual disk instance through a network interface, and an input/output performance rate for one or more disks (e.g., 100 I/O's per second).

In some implementations, the fact that the disk instance is a virtual disk instance is transparent to the user. In particular, the user can be presented with an interface for configuring a system presented as a disk on a physical host machine. Thus, the interface presents parameters purportedly for a particular device instance that the user can use, for example, to provide remote services or storage (e.g., to be used as network storage or a network service provider).

The system receives input specifying one or more of the parameters (304). In particular, the user can provide an input specifying two or more of the parameters for configuring the virtual disk instance independently of each other. For example, the user can specify a size and I/O performance rate for a virtual disk independently. In some implementations, the presented interface includes fields in which the user can specify values for the respective parameters. In some other implementations, drop down menus provide a plurality of discrete values that the user can independently select from. The user can specify parameters based on the user's particular needs. For example, particular applications can require high performance. A user planning to operate an application requiring high performance on the disk instance can provide input specifying a particular performance rate (e.g., in terms of I/O per second or communication bandwidth).

Thus, for example, a user can configure a virtual machine instance having one or more virtual disks that provide two terabytes (TB) of storage. The user can then select values for the performance of the one or more virtual disks, for example, selecting from among a plurality of I/O rates. Consequently, the user can customize the machine instance to a particular performance and size of one or more associated disk instances. As a result, for example, a user can select a high performance on a large storage size or a small storage size.

In some implementations, the interface presents a corresponding pricing based on the user input. The price can be a function of the parameter values. For example, for a given storage size, different performance rates can result in different pricing. For example, the price of a virtual disk instance having a particular performance can be higher than the price of another virtual disk instance having the same storage size but lower performance. In some implementations, the pricing is calculated such that a single virtual disk instance having particular size and performance is less costly or equal cost to two distinct virtual disk instances that combine to provide the same size and performance.

The system determines one or more physical resources to satisfy the received parameters (306). For example, the system can determine a combination of one or more host machines (e.g., host machines 102, 104 in FIG. 1) that include hardware disk drives, processing power, memory, and other hardware or software parameters that can satisfy the received virtual disk configuration parameters. In some implementations, specific physical resources, from a collection of physical resources, are identified. In some other implementations, particular types of physical resources are identified (e.g., disks having at least a particular capacity or performance), from which a combination of specific resources can be selected as needed. For a particular physical resource, the entire physical resource can be identified or a particular shared portion of the physical resource can be identified. For example, the I/O rate is limited by the physical characteristics of the particular hardware disk. Thus, in order to achieve a specific I/O rate, multiple physical resources or a share of a physical resource can be used. In some implementations, different processes are performed to configure virtual machine resources from processes performed to identify particular characteristics of virtual disks. A virtual disk matching received parameters can be later modified even after being associated with a particular virtual machine.

The system generates a virtual disk instance having the specified configuration (308). The virtual disk instance can be associated with a virtual machine instance that can run on one or more host machines. The virtual machine instance can be associated with the determined physical resources. In particular, the determined physical resources or shares of resources can be allocated to the virtual machine instance. Alternatively, the virtual machine instance can be associated with a collection of physical resources that can be selectively used to provide the required configuration. Thus, for example, if a physical resource fails, one or more replacement physical resources can be associated with the virtual machine instance. Additionally, multiple virtual machine instances can be generated, each associated with corresponding physical resources and connected, for example, as one or more virtual network pairs.

The virtual machine instance is associated with a virtual hardware including a virtual persistent disk having the specified size and I/O rate. Additionally, the virtual machine instance can include a guest operating system and one or more guest applications as specified by the user. Thus, the user can operate the virtual machine instance (e.g., over a network) as if it were a physical machine having the specified configuration. In some implementations, generating the virtual machine instance includes generating one or more virtual disk instances based on specified configuration parameter values, e.g., size, I/O rate, throughput.

In some implementations, the performance of the associated physical resources is smoothed to mimic the performance of the virtual hardware. In particular, the collection of two or more physical resources (e.g., multiple disks) can have the overall performance required by the user input parameters, but the behavior may not be identical to a single disk having the same performance characteristics. The smoothing is performed to allow the virtual disks to mimic corresponding physical hardware. For example, this allows for improved performance of applications running on virtual machines that are designed for latency and throughput limitations of physical devices and can provide consistent performance.

In some implementations, the process 300 is performed at creation time for one or more virtual machines. However, in some other implementation, steps of process 300 can be performed at runtime such that users can adjust performance of virtual machines by modifying one or more parameters. The virtual machines can then be reconfigured based on the modified one or more parameters.

Figure 4:
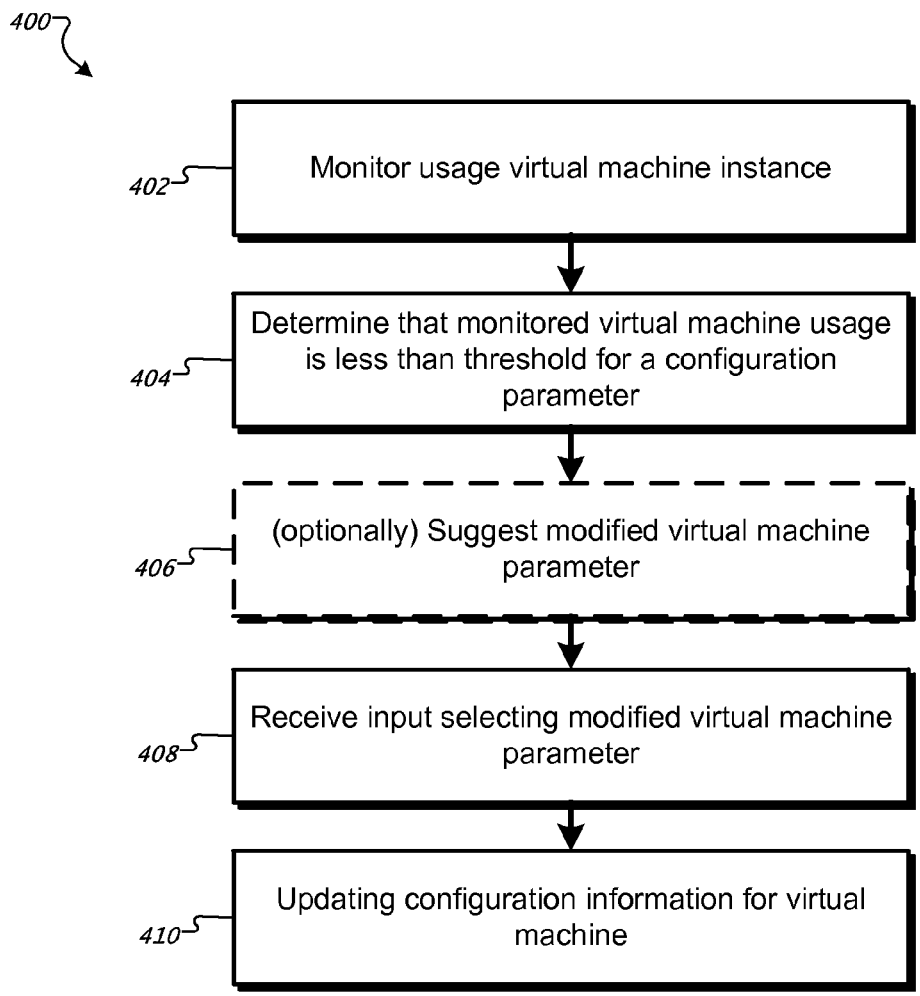
FIG. 4 is a flow diagram of an example process for dynamically modifying a virtual machine configuration.

FIG. 4 is a flow diagram of an example process for dynamically modifying a virtual machine configuration. For convenience, the process 400 will be described with respect to a system having one or more computing devices that performs the process 400. In some implementations, the process 400 can be performed by the virtual machine system 100 of FIG. 1.

The system monitors the usage of a virtual disk instance (402). In particular, the system can monitor the usage of a virtual disk instance relative to specified configuration parameters for the virtual disk instance (e.g., as part of a particular virtual machine). The specified configuration parameters can be a combination of default parameter values for the virtual disk instance or can include one or more individually specified parameter values (e.g., as described above with respect to FIG. 3). The monitoring can include monitoring the number of actual I/O requests relative to the specified I/O rate for the virtual disk instance. In some implementations, the system provides live usage monitoring. For example, a user can be presented with metrics on actual usage versus capacity for a virtual machine instance or particular virtual disks.

The system determines that the monitored virtual disk instance usage is less than a threshold for a particular parameter (404). In some implementations, the threshold for the usage parameter is a particular percentage (e.g., 80%) of the specified parameter value. For example, an I/O rate performance parameter can have a value of 200 I/O operations per second for a given virtual disk instance. The monitoring can determine, over a specified period of time, that the actual usage is 150 I/O per second. The system can determine that this monitored usage is less than the threshold amount (e.g., less than 80%).

The system optionally suggests a modified virtual disk instance parameter (406). A virtual machine disk can have a pricing that is a function of multiple configuration parameters. When the actual usage for a configuration parameter is less than the threshold value, a different configuration parameter value may yield savings for the user. For example, an I/O rate of 160 I/O operations per second may have a lower pricing than an I/O rate of 200 I/O operations per second. Therefore, the system can suggest to the user that the configuration parameter be modified based on the monitored usage. In some implementations, the suggestion includes presenting a corresponding change in pricing for the virtual disk instance having the new parameter value.

The system receives input selecting the modified virtual disk parameter (408). For example, a user can input a selection in a user interface presented by the system. The user selection can include accepting a specific suggested parameter value or a user selection from two or more possible parameter values, e.g., using a drop down menu or other selection mechanism. Alternatively, in some implementations, the user specifies one or more modified virtual disk parameters. For example, the user can use a user interface provided by an API that allows the user to change the configuration of one or more virtual disks. Modifying virtual machine parameters can include modifying an I/O rate or throughput for one or more virtual disks associated with a particular virtual machine.

The system updates configuration information for the virtual disk (410). Updating the configuration information includes updating the virtual disk instance to have the specified configuration. Additionally, the physical resources associated with the virtual disk instance can be adjusted according to the updated configuration. For example, if a different performance is specified, the particular physical resources required to satisfy the performance can change. For example, lower performance disks can be allocated to the updated virtual disk instance. In some implementations, the system updates configuration of a virtual machine instance associated with the updated virtual disk instance.

In some implementations, the monitoring identifies usage exceeding a threshold for a particular parameter. For example, if the actual I/O rate is above the threshold (e.g., above 95% of the specified I/O rate), the system can suggest that the user increase the I/O parameter value in order to maintain high quality performance of the virtual disk instance.

In some alternative implementations, usage characteristics are used to adjust one or more parameters. For example, usage characteristics can be provided to a user interacting with a user interface. The user can then provide adjustments to one or more parameters. Thus, the user specified changes based on the usage information rather than being provided with a suggestion. In some other implementations, the usage characteristics are processed by the system according to specified criteria in order to determine adjustments to one or more parameters without user interaction. The system then updates the configuration information based on the specified changes.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a plurality of user-specified parameter values for a corresponding plurality of parameters of a request for a virtual disk instance, including parameter values for storage size and input/output performance for the virtual disk instance;
   determining one or more initial physical resources that satisfy the plurality of received user-specified parameter values;
   allocating the determined one or more initial physical resources to a virtual disk instance;
   monitoring usage of a first parameter of the virtual disk instance including computing a monitored usage value for the first parameter, the monitored usage value representing how much of a user-specified parameter value for the first parameter was used by the virtual disk instance;
   determining that the monitored usage value is less than the user-specified parameter value of the plurality of user-specified parameter values by at least a predetermined amount;
   in response to determining that the monitored usage value is less than the user-specified parameter value of the plurality of user-specified parameter values by at least a predetermined amount, modifying generating a modified first parameter value for the first parameter based on the monitored usage value for the first parameter;
   generating a modified second parameter value for a second parameter of the user-specified parameter values;
   generating a modified plurality of parameter values from the received parameter values and the modified first and second parameter values, wherein the modified plurality of parameter values includes the modified first parameter value as the parameter value for the first parameter and the modified second parameter value as the parameter value for the second parameter;
   determining one or more updated physical resources that satisfy the modified plurality of parameter values; and
   modifying the allocation of physical resources to the virtual disk instance at runtime including allocating the determined one or more updated physical resources to the virtual disk instance in place of the one or more initial physical resources.

2. The method of claim 1, wherein generating a modified first parameter value for the first parameter based on the monitored usage value for the first parameter comprises determining a modified first parameter value that results in a lower price than a price determined based on the user-specified parameter value for the first parameter.

3. The method of claim 1, wherein:
   receiving a plurality of user-specified parameter values comprises receiving the user-specified parameter values through an interface presented to a user, the interface including fields for specifying discrete values for the user-specified parameter values.

4. The method of claim 1, wherein generating a modified first parameter value based on the monitored usage value comprises:
   determining a modified parameter value for the first parameter that is between the user-specified parameter value and the monitored usage value.

5. The method of claim 1, further comprising:
   adjusting a price associated with the virtual disk instance based on the modified plurality of parameter values.

6. The method of claim 1, wherein the virtual disk instance appears to a user as a single physical disk having the user-specified parameter values for storage size and input/output performance.

7. The method of claim 1, wherein performance of a plurality of physical resources allocated to the virtual disk instance is smoothed to mimic one or more physical resources.

8. The method of claim 1, wherein modifying the allocation of physical resources to the virtual disk instance at runtime comprises dynamically modifying the allocation of physical resources to the virtual disk instance while the virtual disk instance is in use.

9. The method of claim 1, further comprising using the virtual disk instance to build an instance of a virtual machine.

10. The method of claim 1, wherein receiving a plurality of user-specified parameter values includes providing controls for receiving user input specifying virtual disk parameter values unconstrained by physical hardware.

11. A computer program product, encoded on one or more non-transitory computer storage media, comprising instructions that when executed by one or more computers cause the one or more computers to perform operations comprising:
   receiving a plurality of user-specified parameter values for a corresponding plurality of parameters of a request for a virtual disk instance, including parameter values for storage size and input/output performance for the virtual disk instance;
   determining one or more initial physical resources that satisfy the plurality of received user-specified parameter values; and
   allocating the determined one or more initial physical resources to a virtual disk instance;
   monitoring usage of a first parameter of the virtual disk instance including computing a monitored usage value for the first parameter, the monitored usage value representing how much of a user-specified parameter value for the first parameter was used by the virtual disk instance;
   determining that the monitored usage value is less than the user-specified parameter value of the plurality of user-specified parameter values by at least a predetermined amount;
   in response to determining that the monitored usage value is less than the user-specified parameter value of the plurality of user-specified parameter values by at least a predetermined amount, generating a modified first parameter value for the first parameter based on the monitored usage value for the first parameter;
   generating a modified second parameter value for a second parameter of the user-specified parameter values;
   generating a modified plurality of parameter values from the received parameter values and the modified first and second parameter values, wherein the modified plurality of parameter values includes the modified first parameter value as the parameter value for the first parameter and the modified second parameter value as the parameter for the second parameter;
   determining one or more updated physical resources that satisfy the modified plurality of parameter values; and
   modifying the allocation of physical resources to the virtual disk instance at runtime including allocating the determined one or more updated physical resources to the virtual disk instance in place of the one or more initial physical resources.

12. The computer program product of claim 11, wherein generating a modified first parameter value for the first parameter based on the monitored usage value for the first parameter comprises determining a modified first parameter value that results in a lower price than a price determined based on the user specified parameter value for the first parameter.

13. The computer program product of claim 11, wherein receiving a plurality of user-specified parameter values comprises receiving the user-specified parameter values through an interface presented to a user, the interface including fields for specifying discrete values for the user-specified parameter values.

14. The computer program product of claim 11, wherein generating a modified first parameter value based on the monitored usage value comprises:
   determining a modified parameter value for the first parameter that is between the user-specified parameter value and the monitored usage value.

15. The computer program product of claim 11, wherein the operations further comprise:
   adjusting a price associated with the virtual disk instance based on the modified plurality of parameter values.

16. The computer program product of claim 11, wherein the virtual disk instance appears to a user as a single physical disk having the user-specified parameter values for storage size and input/output performance.

17. The computer program product of claim 11, wherein performance of a plurality of physical resources allocated to the virtual disk instance is smoothed to mimic one or more physical resources.

18. The computer program product of claim 11, wherein modifying the allocation of physical resources to the virtual disk instance at runtime comprises dynamically modifying the allocation of physical resources to the virtual disk instance while the virtual disk instance is in use.

19. The computer program product of claim 11, wherein the operations further comprise using the virtual disk instance to build an instance of a virtual machine.

20. The computer program product of claim 11, wherein receiving a plurality of user-specified parameter values includes providing controls for receiving user input specifying virtual disk parameter values unconstrained by physical hardware.

21. A system comprising:
   one or more computers and one or more storage devices storing instructions that are operable, when executed by the one or more computers, to cause the one or more computers to perform operations comprising:
   receiving a plurality of user-specified parameter values for a corresponding plurality of parameters of a request for a virtual disk instance, including parameter values for storage size and input/output performance for the virtual disk instance;
   determining one or more initial physical resources that satisfy the plurality of received user-specified parameter values;
   allocating the determined one or more initial physical resources to a virtual disk instance;
   monitoring usage of a first parameter of the virtual disk instance including computing a monitored usage value for the first parameter, the monitored usage value representing how much of a user-specified parameter value for the first parameter was used by the virtual disk instance;
   determining that the monitored usage value is less than the user-specified parameter value of the plurality of user-specified parameter values by at least a predetermined amount;
   in response to determining that the monitored usage value is less than the user-specified parameter value of the plurality of user-specified parameter values by at least a predetermined amount, generating a modified first parameter value for the first parameter based on the monitored usage value for the first parameter;
   generating a modified second parameter value for a second parameter of the user-specified parameter values;
   generating a modified plurality of parameter values from the received parameter values and the modified first and second parameter values, wherein the modified plurality of parameter values includes the modified first parameter value as the parameter value for the first parameter and the modified second parameter value as the parameter for the second parameter;
   determining one or more updated physical resources that satisfy the modified plurality of parameter values; and
   modifying the allocation of physical resources to the virtual disk instance at runtime including allocating the determined one or more updated physical resources to the virtual disk instance in place of the one or more initial physical resources.

22. The system of claim 21, wherein generating a modified first parameter value for the first parameter based on the monitored usage value for the first parameter comprises determining a modified first parameter value that results in a lower price than a price determined based on the user specified parameter value for the first parameter.

23. The system of claim 21, wherein receiving a plurality of user-specified parameter values comprises receiving the user-specified parameter values through an interface presented to a user, the interface including fields for specifying discrete values for the user-specified parameter values.

24. The system of claim 21, wherein generating a modified first parameter value based on the monitored usage value comprises:
   determining a modified parameter value for the first parameter that is between the user-specified parameter value and the monitored usage value.

25. The system of claim 21, wherein the operations further comprise:
   adjusting a price associated with the virtual disk instance based on the modified plurality of parameter values.

26. The system of claim 21, wherein the virtual disk instance appears to a user as a single physical disk having the user-specified parameter values for storage size and input/output performance.

27. The system of claim 21, wherein performance of a plurality of physical resources allocated to the virtual disk instance is smoothed to mimic one or more physical resources.

28. The system of claim 21, wherein modifying the allocation of physical resources to the virtual disk instance at runtime comprises dynamically modifying the allocation of physical resources to the virtual disk instance while the virtual disk instance is in use.

29. The system of claim 21, wherein the operations further comprise using the virtual disk instance to build an instance of a virtual machine.

30. The system of claim 21, wherein receiving a plurality of user-specified parameter values includes providing controls for receiving user input specifying virtual disk parameter values unconstrained by physical hardware.

31. A method performed by data processing apparatus, the method comprising:
   monitoring usage of a virtual disk instance having one or more initial physical resources allocated according to a plurality of user-specified parameter values including values for a storage size and input/output performance;

computing a monitored usage value for a first parameter of the plurality of user-specified parameter values, the monitored usage value representing how much of a user-specified parameter value for the first parameter was used by the virtual disk instance;

determining that the monitored usage value is less than user-specified parameter value of the plurality of user-specified parameter values by at least a predetermined amount;

in response to determining that the monitored usage value is less than the user-specified parameter value by at least a predetermined amount, determining a suggested modification value for the first parameter based on the monitored usage value;

providing, to a user, the suggested modification value for the first parameter;

receiving user input from the user selecting the suggested modification value for the first parameter;

modifying the user-specified parameter value for the first parameter based on the suggested modification value;

replacing the user-specified parameter value of the plurality of user-specified parameter values with the suggested modification value selected by the user;

determining one or more updated physical resources that satisfy the suggested modification value; and modifying the allocation of physical resources to the virtual disk instance at runtime including allocating the determined one or more updated physical resources to the virtual disk instance in place of one or more initial physical resources allocated to the virtual disk instance.

32. The method of claim 31, wherein determining a suggested modification value for the first parameter based on the monitored usage value comprises determining a modified parameter value that results in a reduced allocation of physical resources than the allocation of the initial physical resources.

33. A system comprising:
one or more computers and one or more storage devices storing instructions that are operable, when executed by the one or more computers, to cause the one or more computers to perform operations comprising:
monitoring usage of a virtual disk instance having one or more initial physical resources allocated according to a plurality of user-specified parameter values including values for a storage size and input/output performance;

computing a monitored usage value for a first parameter of the plurality of user-specified parameter values, the monitored usage value representing how much of a user-specified parameter value for the first parameter was used by the virtual disk instance;

determining that the monitored usage value is less than the user-specified parameter value of the plurality of user-specified parameter values by at least a predetermined amount;

in response to determining that the monitored usage value is less than the user-specified parameter value by at least a predetermined amount, determining a suggested modification value for the first parameter based on the monitored usage value;

providing, to a user, the suggested modification value for the first parameter;

receiving user input from the user selecting the suggested modification value for the first parameter;

modifying the user-specified parameter value for the first parameter based on the suggested modification value;

replacing the user-specified parameter value of the plurality of user-specified parameter values with the suggested modification value selected by the user;

determining one or more updated physical resources that satisfy the suggested modification value; and modifying the allocation of physical resources to the virtual disk instance at runtime including allocating the determined one or more updated physical resources to the virtual disk instance in place of one or more initial physical resources allocated to the virtual disk instance.

34. The system of claim 33, wherein determining a suggested modification value for the first parameter based on the monitored usage value comprises determining a modified parameter value that results in a reduced allocation of physical resources than the allocation of the initial physical resources.

35. A computer program product, encoded on one or more non-transitory computer storage media, comprising instructions that when executed by one or more computers cause the one or more computers to perform operations comprising:
monitoring usage of a virtual disk instance having one or more initial physical resources allocated according to a plurality of user-specified parameter values including values for a storage size and input/output performance;

computing a monitored usage value for a first parameter of the plurality of user-specified parameter values, the monitored usage value representing how much of a user-specified parameter value for the first parameter was used by the virtual disk instance;

determining that the monitored usage value is less than the user-specified parameter value of the plurality of user-specified parameter values by at least a predetermined amount;

in response to determining that the monitored usage value is less than the user-specified parameter value by at least a predetermined amount, determining a suggested modification value for the first parameter based on the monitored usage value;

providing, to a user, the suggested modification value for the first parameter;

receiving user input from the user selecting the suggested modification value for the first parameter;

modifying the user-specified parameter value for the first parameter based on the suggested modification value;

replacing the user-specified parameter value of the plurality of user-specified parameter values with the suggested modification value selected by the user;

determining one or more updated physical resources that satisfy the suggested modification value; and modifying the allocation of physical resources to the virtual disk instance at runtime including allocating the determined one or more updated physical resources to the virtual disk instance in place of one or more initial physical resources allocated to the virtual disk instance.

36. The computer program product of claim 35, wherein determining a suggested modification value for the first parameter based on the monitored usage value comprises determining a modified parameter value that results in a reduced allocation of physical resources than the allocation of the initial physical resources.

* * * * *